(12) United States Patent
Chu

(10) Patent No.: US 7,532,200 B2
(45) Date of Patent: May 12, 2009

(54) APPARATUS FOR SETTING MULTI-STAGE DISPLACEMENT RESOLUTION OF A MOUSE

(75) Inventor: Chi-Chun Chu, Toufen Township, Miaoli County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 592 days.

(21) Appl. No.: 11/036,127

(22) Filed: Jan. 18, 2005

(65) Prior Publication Data

US 2005/0248533 A1    Nov. 10, 2005

(30) Foreign Application Priority Data

May 5, 2004    (TW) .............................. 93112646 A

(51) Int. Cl.
*G06F 3/33*    (2006.01)

(52) U.S. Cl. ...................... 345/163; 345/164; 345/158; 345/165; 345/157

(58) Field of Classification Search ......... 345/161–167, 345/156–158, 426, 520, 173, 184, 581; 700/83; 382/154; 250/557; 341/20; 178/18.06; 710/63; 702/64
See application file for complete search history.

(56) References Cited

U.S. PATENT DOCUMENTS

| | | | | |
|---|---|---|---|---|
| 4,977,397 A * | 12/1990 | Kuo et al. | ................... | 345/163 |
| 5,374,942 A * | 12/1994 | Gilligan et al. | ............... | 345/157 |
| 5,428,367 A * | 6/1995 | Mikan | ......................... | 345/157 |
| 5,448,697 A * | 9/1995 | Parks et al. | ................... | 345/520 |
| 5,648,642 A * | 7/1997 | Miller et al. | ............. | 178/18.06 |
| 5,704,037 A * | 12/1997 | Chen | ......................... | 345/184 |
| 5,841,078 A * | 11/1998 | Miller et al. | ............. | 178/18.06 |
| 5,854,621 A * | 12/1998 | Junod et al. | .................. | 345/158 |
| 5,986,585 A * | 11/1999 | Pusch | .......................... | 341/20 |
| 5,994,710 A * | 11/1999 | Knee et al. | ................... | 250/557 |
| 6,232,958 B1 * | 5/2001 | Casebolt | ..................... | 345/156 |
| 6,247,075 B1 * | 6/2001 | Wang et al. | ................... | 710/63 |
| 6,462,733 B1 * | 10/2002 | Murakami | .................. | 345/173 |
| 6,567,073 B1 * | 5/2003 | Levin | ......................... | 345/163 |
| 6,677,929 B2 * | 1/2004 | Gordon et al. | ............. | 345/156 |
| 6,717,572 B1 * | 4/2004 | Chou et al. | .................. | 345/157 |
| 6,727,889 B2 * | 4/2004 | Shaw | ......................... | 345/163 |
| 6,876,762 B1 * | 4/2005 | Ono | ............................ | 382/154 |
| 7,006,881 B1 * | 2/2006 | Hoffberg et al. | ............. | 700/83 |
| 7,081,884 B2 * | 7/2006 | Kong | ......................... | 345/163 |
| 7,161,585 B2 * | 1/2007 | Lauffenburger et al. | ..... | 345/166 |
| 2002/0111757 A1 * | 8/2002 | Boehler et al. | ................ | 702/64 |
| 2002/0175893 A1 * | 11/2002 | Ore-Yang | .................. | 345/156 |
| 2003/0058219 A1 * | 3/2003 | Shaw | ......................... | 345/161 |

(Continued)

*Primary Examiner*—Prabodh M. Dharia
(74) *Attorney, Agent, or Firm*—Bacon & Thomas, PLLC

(57) ABSTRACT

An apparatus for setting multi-stage displacement resolution of a mouse is disclosed, which has a X-Y axis plane displacement detector, a switching circuit and a mouse micro controller. The X-Y axis plane displacement detector senses a distance and a moving direction generated by the mouse. The switching circuit has at least one switch. The mouse micro controller is coupled to the X-Y axis plane displacement detector and the switching circuit. The mouse micro controller sets the mouse resolution based on each switch, and responds to the distance and moving direction sensed by the X-Y axis plane displacement detector to provide a control signal to a computer connected to the mouse, thereby moving the mouse cursor on the screen of the computer, wherein the mouse cursor is moved based on the mouse resolution.

9 Claims, 5 Drawing Sheets

U.S. PATENT DOCUMENTS

| | | | |
|---|---|---|---|
| 2003/0184552 A1* | 10/2003 | Chadha | 345/581 |
| 2003/0214481 A1* | 11/2003 | Xiong | 345/157 |
| 2004/0001043 A1* | 1/2004 | Lin | 345/157 |
| 2004/0017355 A1* | 1/2004 | Shim | 345/157 |
| 2004/0032409 A1* | 2/2004 | Girard | 345/426 |
| 2004/0227728 A1* | 11/2004 | McAlindon | 345/156 |
| 2005/0062720 A1* | 3/2005 | Rotzoll et al. | 345/166 |
| 2005/0073501 A1* | 4/2005 | Chen | 345/163 |
| 2005/0156887 A1* | 7/2005 | Chen | 345/163 |
| 2005/0179663 A1* | 8/2005 | Ludwig | 345/167 |
| 2006/0164393 A1* | 7/2006 | Wu et al. | 345/163 |
| 2008/0062131 A1* | 3/2008 | Chan et al. | 345/166 |

* cited by examiner

APPARATUS FOR SETTING MULTI-STAGE DISPLACEMENT RESOLUTION OF A MOUSE

BACKGROUND OF THE INVENTION

1. Field of the Invention

The present invention relates to an apparatus for setting multi-stage displacement resolution of a mouse and, more particularly, to the apparatus for setting multi-stage displacement resolution of the mouse using a switch to set the mouse resolution.

2. Description of Related Art

Following the popularity of windows operation system, mice have become the standard-equipment for personal computers. Before a user uses a mouse, he/she has to install a software driver or tool provided by the manufacturer for operating the mouse or setting the operating mode and resolution of the mouse. For example, when the user wants to adjust the mouse resolution, he/she has to execute the software driver/tool and finds out the item to adjust the mouse resolution, so as to click or key in a new resolution for completing resolution adjustment.

Users may find that it is inconvenient to adjust the mouse resolution. For example, users may not understand the software knowledge so that they can't install the driver/tool successfully. Even the users may install the driver/tool successfully, they are not aware of how to find out the item which can adjust the mouse resolution to complete the resolution adjustment. Furthermore, the users may loss the floppy/CD-R that has the software driver/tool and thus the adjustment of the mouse resolution cannot be done. Therefore, a need exists for providing an apparatus for setting multi-stage displacement resolution of a mouse.

SUMMARY OF THE INVENTION

An object of the present invention is to provide an apparatus for setting multi-stage displacement resolution of a mouse so as to set the mouse resolution directly through a switch of the mouse.

Another object of the present invention is to provide an apparatus for setting multi-stage displacement resolution of a mouse so as to adjust the mouse resolution without using software driver or tool.

In accordance with one aspect of this invention, there is provided an apparatus for setting multi-stage displacement resolution of a mouse, which comprises: a X-Y axis plane displacement detector, for sensing a distance and a moving direction generated by the mouse in a two-dimensional space; a switching circuit, having at least one switch; and a mouse micro controller, coupled to the X-Y axis plane displacement detector and the switching circuit, the mouse micro controller setting the mouse resolution based on each switch, the mouse micro controller responding to the distance and moving direction sensed by the X-Y axis plane displacement detector to provide a control signal to a computer connected to the mouse, thereby moving the mouse cursor on a screen of the computer, the mouse cursor being moved based on the mouse resolution.

In accordance with another aspect of this invention, there is provided an apparatus for setting multi-stage displacement resolution of a mouse, which comprises: a X-Y axis plane displacement detector, for sensing a distance and a moving direction generated by the mouse in a two-dimensional space; a N-stage switch, having a switching button capable of being switched to position 1 to N, where N is a positive integer; and a mouse micro controller, coupled to the X-Y axis plane displacement detector and the switching circuit, the mouse micro controller setting the mouse resolution based on each switch, the mouse micro controller responding to the distance and moving direction sensed by the X-Y axis plane displacement detector to provide a control signal to a computer connected to the mouse, thereby moving the mouse cursor on a screen of the computer, the mouse cursor being moved based on the mouse resolution.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
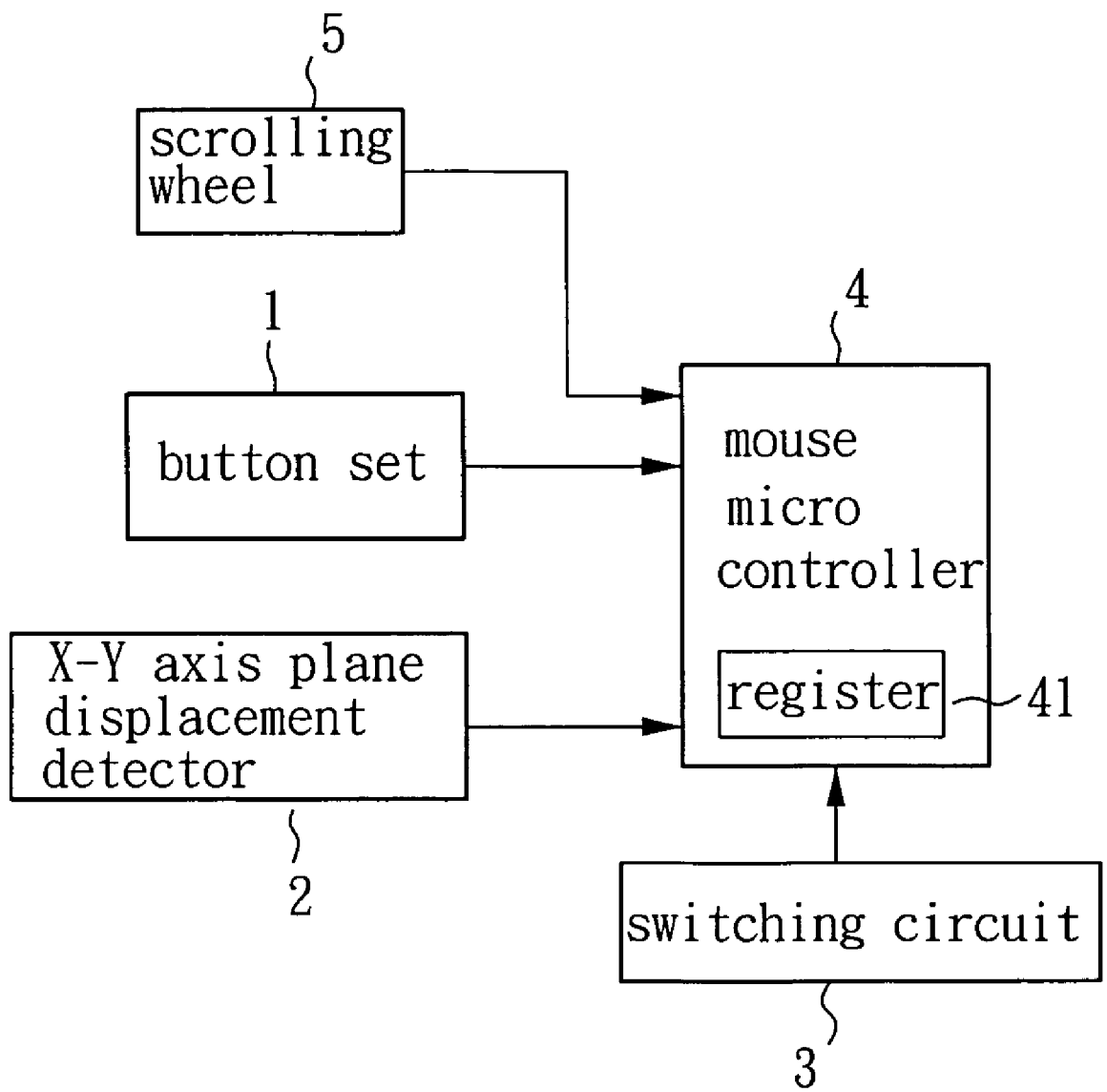
FIG. 1 is a block diagram according to the preferred embodiment of the present invention.

In accordance with a preferred embodiment of the present invention, FIG. 1 shows a block diagram of the apparatus for setting multi-stage displacement resolution of a mouse, which includes a button set 1, a scrolling wheel 5, a X-Y axis plane displacement detector 2, a switching circuit 3 and a mouse micro controller 4. The button set 1 is used for clicking the icon selected by the mouse cursor. The button set 1 further includes a left button and a right button. The scrolling wheel 5 is used for scrolling windows content up or down. Therefore, a user can make the mouse micro controller 4 generate an appropriate controlling signal to a computer to which the mouse is connected by operating the button set 1 and the scrolling wheel 5, thereby clicking icons or scrolling windows content. The X-Y axis plane displacement detector 2 is used for sensing a distance and a moving direction generated by the mouse in a two-dimensional space to make the mouse micro controller 4 generate the appropriate controlling signal to the computer for moving the mouse cursor on the screen of the computer. The mouse micro controller 4 sets a resolution value so that the mouse cursor movement is performed based on the resolution value, wherein the resolution value is preferably stored in a register 41 inside the mouse micro controller 4.

Figure 2:
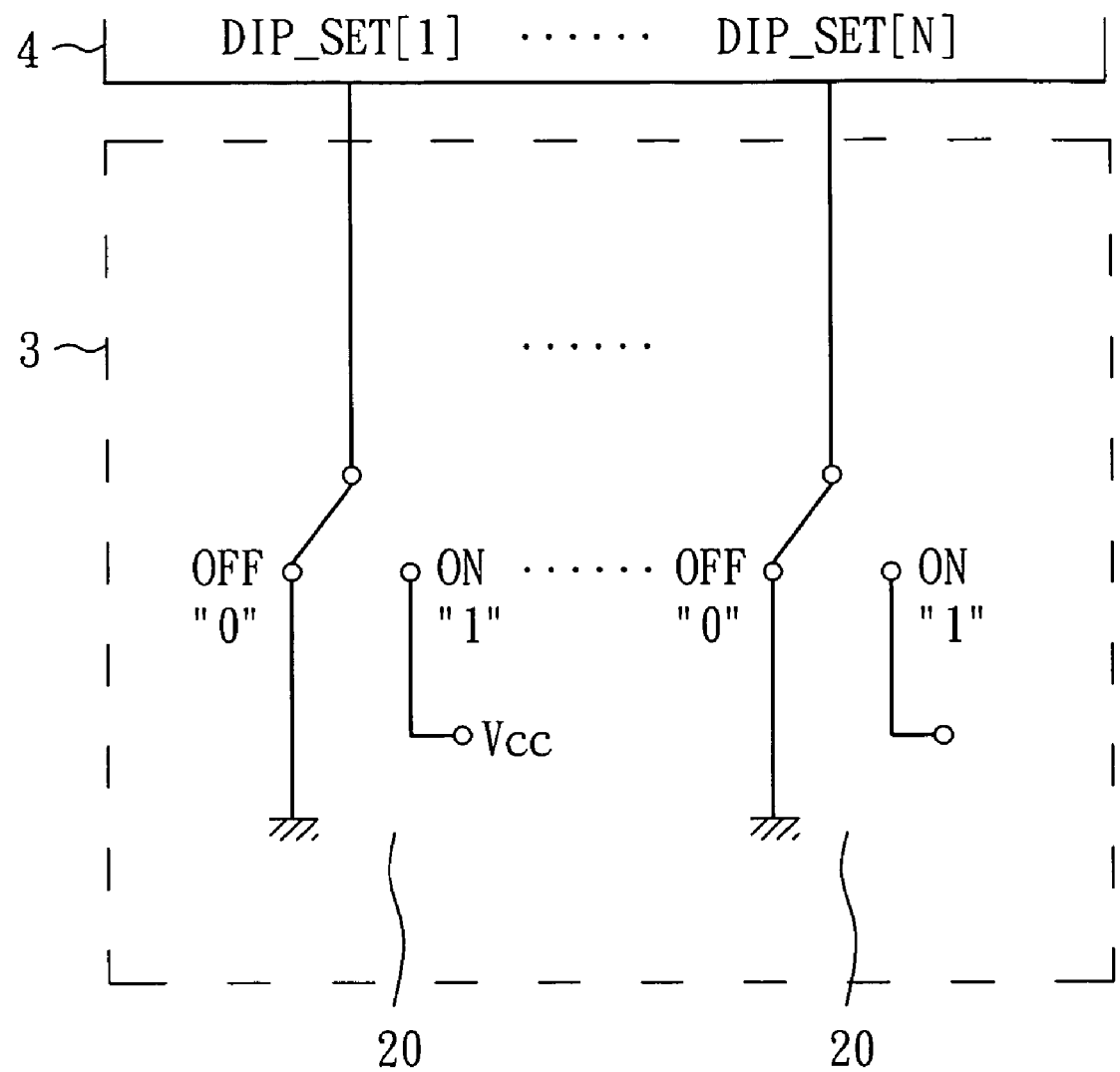
FIG. 2 is a circuit diagram according to the switching circuit of the preferred embodiment of the present invention.

The switching circuit 3 is coupled to the mouse micro controller 4 to set the resolution value. FIG. 2 shows a circuit diagram of the switching circuit 3, which includes a plurality of switches 20. Each switch 20 is coupled to a resolution setting pin DPI_SET [1]~DPI_SET [N], respectively. The state of the resolution setting pin coupled to the switch 20 is 1 (e.g. high level state) when the switch 20 is on. On the contrary, the state of the resolution setting pin is 0 (e.g. low level state) as the switch 20 is off. Therefore, the mouse micro controller 4 can determine the resolution value based on the states of the resolution setting pins DPI_SET [1]~DPI_SET [N].

In this preferred embodiment of the present invention, the number of available resolution values depends on the number of the switches 20. That is, when the switching circuit 3 has N switches 20, the number of available resolution values is $2^N$. Table 1 shows that four available resolution values are determined by using two switches 20:

TABLE 1

| Resolution Value | Switch 1 | Switch 2 |
|---|---|---|
| 400 dpi | OFF | OFF |
| 600 dpi | OFF | ON |
| 800 dpi | ON | OFF |
| 1000 dpi | ON | OFF |

Figure 3:
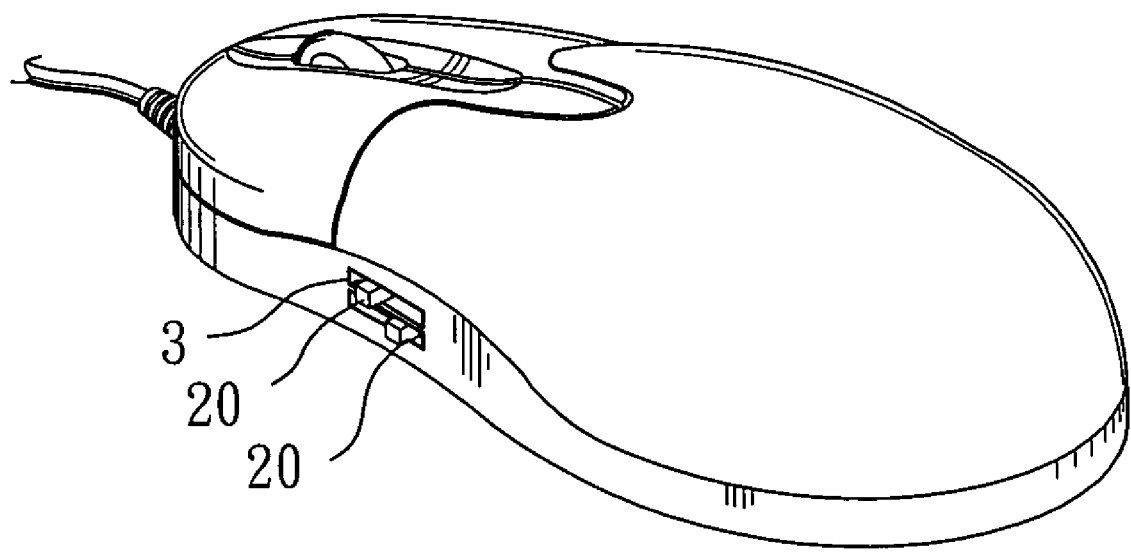
FIG. 3 is an appearance of the mouse of the preferred embodiment of the present invention.

The switching circuit 3 is configured on an appropriate position of the mouse so that the user can adjust the setting of the switching circuit 3. FIG. 3 shows that the switching circuit 3 is configured on an edge of the mouse cover, wherein the switch 20 is a DIP (Dual In-line Package) switch so that the user can set the switch 20 to turn on or turn off conveniently.

Figure 4:
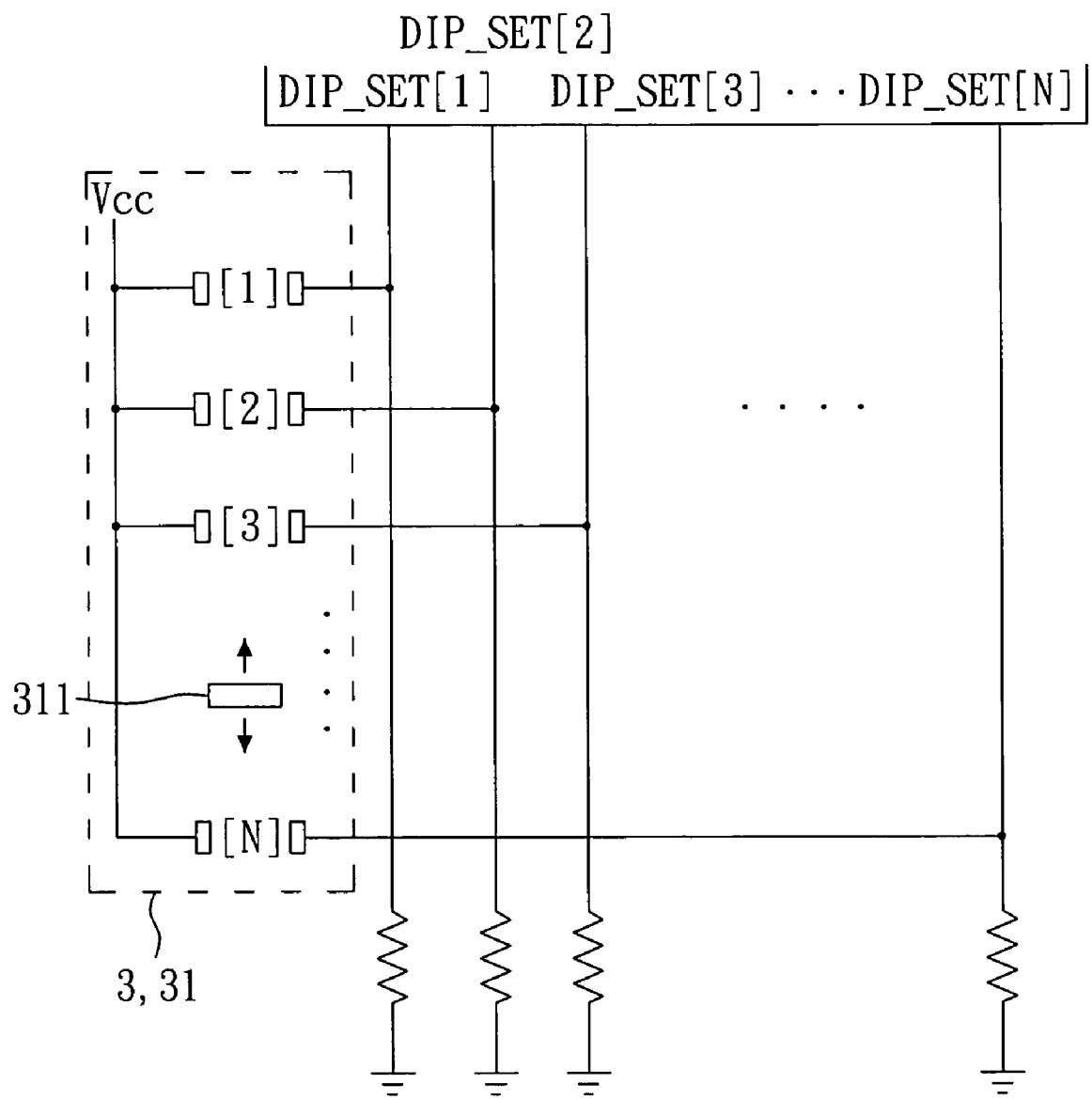
FIG. 4 is a circuit diagram according to the switching circuit of another preferred embodiment of the present invention.
Figure 5:
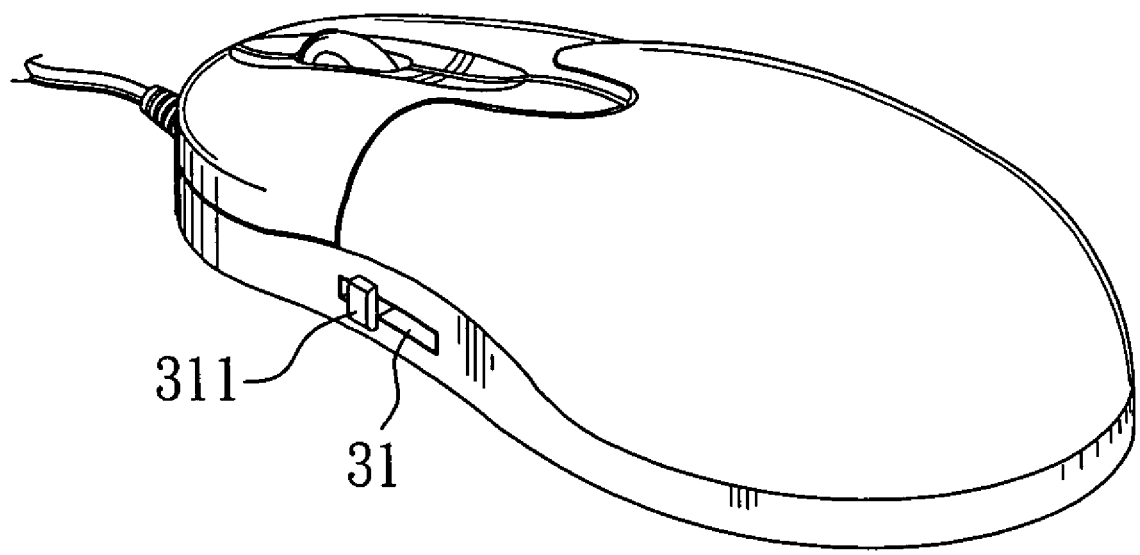
FIG. 5 is an appearance of the mouse of another preferred embodiment of the present invention.

FIG. 4 shows an alternative embodiment of the switching circuit 3. In this embodiment, the switching circuit 3 is N-stage switch 31. The switching button 311 of the switching circuit 31 can be switched to position [i] (i=1~N), thereby making the resolution setting pin DPI_SET [i] of the mouse micro controller 4 to be 1 and making the other resolution setting pins to be 0. Therefore, the mouse micro controller 4 can determine the resolution value based on the states of the resolution setting pins DPI_SET [1]~DPI_SET [N]. Accordingly, the number of the available resolutions is N. FIG. 5 shows that the N-stage switch is configured on an edge on the mouse cover so that the user can set the resolution as required conveniently.

The mouse can be connected to the computer via an USB interface. When the computer is powered on or the mouse is connected to the computer, the mouse micro controller 4 determines the resolution value based on the state of the switching circuit 3. Accordingly, the mouse is operating based on the resolution value. Furthermore, when the state of the switching circuit 3 is changed, the mouse micro controller 4 reads the stat of the switching circuit 3 again to determine the new resolution value and subsequently the mouse is operating based on the new resolution value.

In view of the foregoing, it is known that the present invention utilizes the switching circuit to set the resolution value of the mouse micro controller so that the user can directly set the resolution value via the switching circuit without using software driver or tool.

Although the present invention has been explained in relation to its preferred embodiment, it is to be understood that many other possible modifications and variations can be made without departing from the spirit and scope of the invention as hereinafter claimed.

What is claimed is:

1. An apparatus for setting multi-stage displacement resolution of a mouse, comprising:

a X-Y axis plane displacement detector, for sensing a distance and a moving direction generated by the mouse in a two-dimensional space;

a switching circuit for setting a resolution value, the switching circuit having multiple switches for being manually adjusted to generate the resolution value directly, each switch being coupled to a resolution setting pin, each resolution setting pin having a state determined by the switch coupled thereto; and a mouse micro controller with a register, coupled to the X-Y axis plane displacement detector and the switching circuit, the mouse micro controller determining the resolution value based on the states of the resolution setting pins, setting a mouse resolution based on the resolution value and storing the resolution value in the register, the mouse micro controller responding to the distance and moving direction sensed by the X-Y axis plane displacement detector to provide a control signal to a computer connected to the mouse, thereby moving the mouse cursor on a screen of the computer, the mouse cursor being moved directly based on the resolution value stored in the register.

2. The apparatus as claimed in claim 1, further comprising a button set for clicking an icon selected by the mouse cursor.

3. The apparatus as claimed in claim 2, wherein the button set has a left button and a right button.

4. The apparatus as claimed in claim 1, wherein the switching circuit is configured on a lateral surface of the mouse.

5. The apparatus as claimed in claim 4, wherein the switching circuit is a DIP switch.

6. An apparatus for setting multi-stage displacement resolution of a mouse, comprising:

a X-Y axis plane displacement detector, for sensing a distance and a moving direction generated by the mouse in a two-dimensional space;

an N-stage switch for setting a resolution value, the N-stage switch circuit having a switching button capable of being manually switched to one of positions 1 to N, and accordingly activating a connected resolution setting pin to indicate a state, where N is a positive integer; and a mouse micro controller with a register, coupled to the X-Y axis plane displacement detector and the switching circuit, the mouse micro controller determining the resolution value based on the state of the connected resolution setting pins, setting a mouse resolution based on the resolution value and storing the resolution value in the register, the mouse micro controller responding to the distance and moving direction sensed by the X-Y axis plane displacement detector to provide a control signal to a computer connected to the mouse, thereby moving the mouse cursor on a screen of the computer, the mouse cursor being moved directly based on the resolution value stored in the register.

7. The apparatus as claimed in claim 6, further comprising a button set for clicking an icon selected by the mouse cursor.

8. The apparatus as claimed in claim 7, wherein the button set has a left button and a right button.

9. The apparatus as claimed in claim 6, wherein the N-stage switch is configured on a lateral surface of the mouse.

* * * * *